Dec. 27, 1966  R. E. BORN  3,294,380
SOLID DOME DIFFUSER WITH TRAP
Filed Oct. 4, 1963
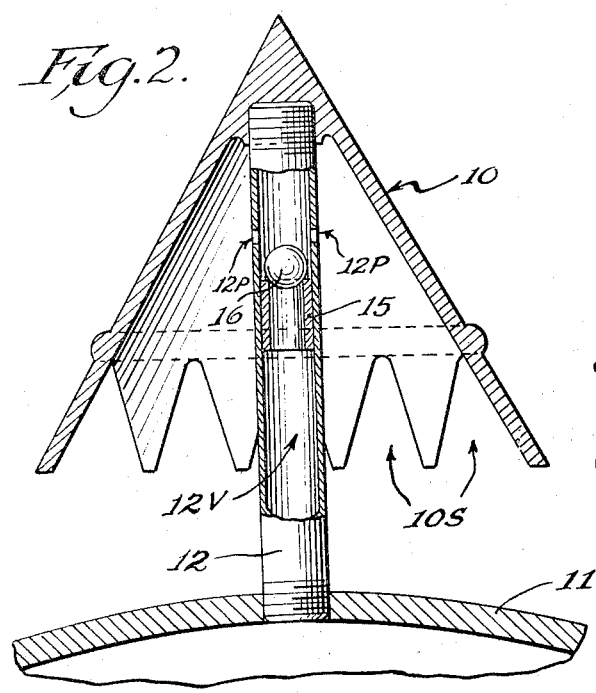
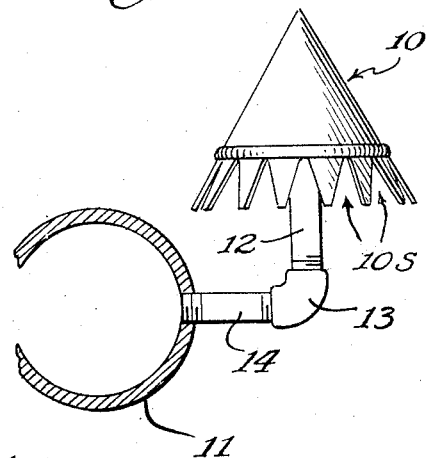
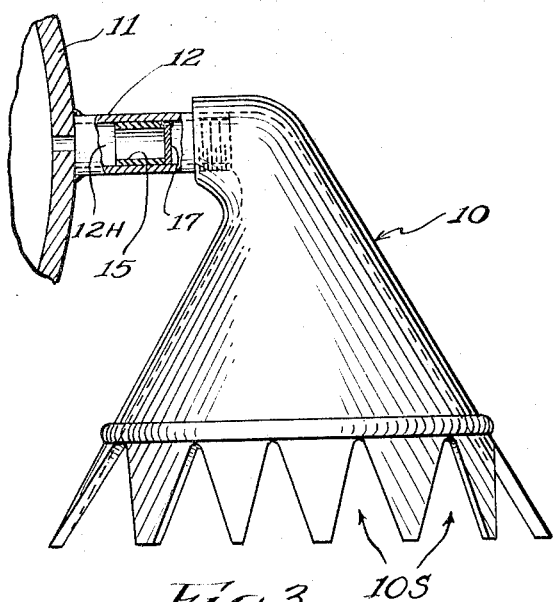
Inventor
Robert E. Born
By Mann, Brown & McWilliams
Attys.

United States Patent Office 3,294,380
Patented Dec. 27, 1966

3,294,380
SOLID DOME DIFFUSER WITH TRAP
Robert E. Born, Broadview, Ill., assignor to American Well Works, a corporation of Illinois
Filed Oct. 4, 1963, Ser. No. 313,986
1 Claim. (Cl. 261—121)

This invention relates to diffusers of the type that introduce a gas under pressure into a liquid at a submerged location. The most common application of this arises in a sewage aeration operation such as pre-aeration, grit removal, channel aeration or the activated sludge process. Another typical operation occurs in the introduction of carbon dioxide into water for the purpose of recarbonation or alkalinity adjustment.

More particularly, the invention is concerned with diffusers of the impermeable dome type. The dome forms a pocket for the gas that is supplied to the diffuser, the gas pressure being slightly greater than the liquid pressure to enable discharge of gas into the liquid at regions along the lower extremity of the dome. For example where the diffuser is submerged in sewage to a depth of 15 feet, air is supplied at a pressure of 6 p.s.i.

In the usual installation, the air is normally supplied to the diffuser to be discharged into the surrounding liquid. In the event of any major power failure, the supply of gas under pressure may be abruptly terminated and permit backup of liquid into the gas supply distribution system. In the case of sewage aeration the resultant contamination and fouling of the distribution system is a serious problem, particularly where impermeable dome diffusers opening directly into the sewage are employed.

The principal object of the invention is the provision of an automatic trap in an impermeable dome diffuser for retaining the gas within the dome to act as a compressible cushion resisting back flow of liquid in the event of failure or leakage in the gas supply system.

Another object of the invention is the provision of a trap in the form of a simple check valve located at a position that is protected from contact with liquid.

Still another object of the invention is the provision of an impermeable dome diffuser and a support for mounting the diffuser from a gas supply conduit and comprising a pipe having an internal passage enabling only one way flow of gas from the conduit into the diffuser.

Other objects and advantages of the invention will become apparent during the course of the following description.

In the accompanying drawings forming a part of this invention and in which like numerals are employed to designate like parts throughout the same.

FIG. 1 is a view of the pertinent elements of a sewage aeration system that includes an air main supporting and communicating with an elevated diffuser of the impermeable dome type;

FIG. 2 is an enlarged view similar to that of FIG. 1 and illustrating an alternative mounting for the elevated diffuser which is shown in section to facilitate the disclosure of the invention;

FIG. 3 is a view of a suspended type diffuser mounting arrangement and shows a modified form of check valve for use therewith; and FIG. 4 is an enlarged lengthwise sectional view through the check valve.

Referring now to the drawings in each of FIGS. 1, 2 and 3, numeral 10 generally designates an impermeable dome diffuser that is supplied with gas under pressure from a main gas supply conduit 11 that is submerged within a body of liquid. The diffuser 10 has a solid walled hollow section constituting a dome which provides a gas pocket that may have open communication with the liquid through discharge slots 10S that are spaced about the lower extremity of the dome.

In the usual sewage aeration application, the diffuser 10 is submerged in liquid in a sewage treament tank and air is supplied through the conduit 11 at a pressure slightly greater than the liquid pressure to discharge from the slots 10S as a controlled stream of bubbles.

In the event of loss of pressure in the conduit 11, the hydrostatic pressure acting at the region of the diffuser causes backup of liquid through the diffuser and into the supply conduit. To prevent this backup, the present invention provides a mount for the diffuser in the form of a connection pipe 12 that provides a one-way flow passage for supplying gas from the conduit 11 to the pocket of the diffuser 10 and for preventing reverse flow of gas from the diffuser 10 to the conduit 11. By preventing reverse flow of gas, the gas existing in the pocket of the diffuser 10 at the time of loss of gas pressure is retained to act as a compressible cushion which resists any rise in the level of the sewage within the pocket. Since the gas is normally supplied at a slightly greater pressure than the pressure in the liquid the pressure of the entrapped gas is initially at a high value and little if any actual compression of the cushion can occur. Hence, no substantial rise of liquid is possible within the diffuser dome and the entire air supply system is maintained free of contamination.

In FIG. 1 the pipe 12 projects vertically from an elbow 13 at the end of a horizontal stub 14 which exits from the conduit 11 to locate the diffuser 10 in laterally offset and elevated relation to the conduit 11. Thus the pipe serves as a mechanical support as well as a gas supply connection for the diffuser. In FIG. 2 the pipe 12 extends directly upward of the conduit 11 and again acts both as a mechanical support and a gas supply connection for the elevated diffuser. In each of these elevated diffuser mounting arrangements the pipe 12 provides a vertical flow passage 12V for directing air upwardly into the dome of the diffuser 10. The effective upper end of the flow passage is defined by ports 12P provided in the pipe at an elevated location within the diffuser pocket.

To provide one-way gas flow through the vertical passage 12V a check valve is located within the pipe at a location adjacent the upper end of the flow passage and preferably consists of a stub tube 15 of a rubber-like material and a ball valve 16 of a smooth surfaced heavy material such as stainless steel. For larger flow passages, it may be preferable to employ a larger ball of a lighter weight material such as Teflon plastic or alluminum. The tube 15 is in snug-fit, slip-proof relation in the pipe and provides an annular seat at its upper end facing generally downstream relative to the direction of normal gas flow and the ball valve is loose within the pipe to allow free air flow upwardly through the flow passage.

In FIG. 3, the pipe 12 exits laterally from the conduit 11 and enters the diffuser 10 at the top of its dome. Thus the pipe again acts both as a mechanical support and as a gas supply connection and in this instance it provides a horizontal flow passage 12H leading laterally into the diffuser 10 which is located in downwardly offset position. To provide one-way gas flow through the horizontal passage 12H, a check valve is located within the pipe 12 and as best seen in FIG. 4 consists of a stub tube 15 to present a downstream directed valve seat and a flap valve 17 having one edge permanently affixed to the tube 15 by a fastener 18 normally to hold the flap valve in sealing engagement across the tube seat. The flap valve 17 may be of rubber-like material and may have an internal arrangement normally biasing it to sealing position.

Thus, while a preferred embodiment of the invention has been illustrated herein, it is to be understood that changes and variations may be made by those skilled in the art without departing from the spirit and scope of the appending claim.

What is claimed is:

In a system for introducing a gas into a liquid, said system including a conduit leading to a submerged location within such liquid for supplying gas at a pressure greater than the liquid pressure at such location, in combination, a diffuser for mounting at such location and having an impermeable dome providing a gas pocket that is open at its lower extremity for emitting gas into the liquid surrounding such location, connection means including a horizontal pipe mechanically connected to support said diffuser at an upper region thereof from said conduit and provide a horizontal flow passage communicating from said conduit into said pocket at an elevated region thereof, a sleeve positioned within said pipe to provide a valve seat facing in a downstream direction at a location along said passage, and a flapper valve having one edge affixed to said sleeve to enable said valve to span said seat in sealing relation thereto, said flapper valve being freely shiftable in said downstream direction when sufficient pressure acts in said conduit and being responsive to a predetermined loss of pressure in said conduit to seal against said seat and prevent reverse flow of gas from said pocket into said conduit to trap gas in said pocket to act as a compressible cushion resisting the rise of liquid in said pocket.

References Cited by the Examiner
UNITED STATES PATENTS

| | | |
|---|---|---|
| 1,920,719 | 8/1933 | Stich. |
| 2,359,025 | 9/1944 | Durdin _____ 261—124 |
| 2,672,987 | 3/1954 | Hutchinson _____ 210—136 |
| 2,917,295 | 12/1959 | Hauer _____ 261—124 |

FOREIGN PATENTS

| | | |
|---|---|---|
| 957,013 | 8/1949 | France. |

HARRY B. THORNTON, *Primary Examiner.*

ROBERT F. BURNETT, RONALD R. WEAVER,
*Examiners.*